Apr. 17, 1923.  1,452,441
T. H. RODDA ET AL
AUXILIARY SPRING OR SHOCK ABSORBER FOR VEHICLES, PARTICULARLY MOTOR VEHICLE
Filed Jan. 7, 1922

INVENTOR
THOMAS HENRY RODDA
BERTIE NORMAN RODDA
BY
ATTORNEYS.

Patented Apr. 17, 1923.

1,452,441

UNITED STATES PATENT OFFICE.

THOMAS HENRY RODDA, OF JOSLIN, AND BERTIE NORMAN RODDA, OF TORRENSVILLE, SOUTH AUSTRALIA, AUSTRALIA.

AUXILIARY SPRING OR SHOCK ABSORBER FOR VEHICLES, PARTICULARLY MOTOR VEHICLES.

Application filed January 7, 1922. Serial No. 527,731.

*To all whom it may concern:*

Be it known that we, THOMAS HENRY RODDA and BERTIE NORMAN RODDA, subjects of the King of Great Britain and Ireland, and residents, respectively, of Fifth Avenue, Joslin, State of South Australia, Commonwealth of Australia, and No. 2 Shipster Street, Torrensville, State of South Australia, aforesaid, have invented certain new and useful Improvements in and Relating to Auxiliary Springs or Shock Absorbers for Vehicles, Particularly Motor Vehicles, of which the following is a specification.

This invention relates to certain improvements in or relating to auxiliary springs or shock absorbers for vehicles particularly motor vehicles, and in particular to a shock absorber comprising two curved members arranged in V form with their convex faces opposed, the divergent ends of the curved members being adapted to be connected (in place of the usual shackles or links) between the adjacent ends of the members of the main spring, or between one end of the main spring and the adjacent frame member, so that as pressure is applied the opposed faces of the curved members will gradually meet and stabilize the remainder of the divergent parts.

According to this present invention the curved members are made independently but are fastened together at the junction end by a clamping device which furthermore is so designed that although it does not in any way affect the closing together of the two curved members it prevents them opening too wide as they are liable to do when the weight is taken off the spring, as for instance when the vehicle passes over an exceptional obstruction or hollow, or when the vehicle rolls or swings when turning a corner.

In order however that our invention may be clearly understood we will describe the same with reference to the accompanying drawings in which—

Figure 1:
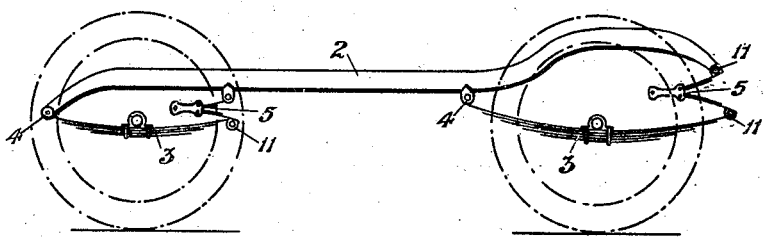
Fig. 1 is a side elevation of part of an automobile frame provided with semi-elliptic springs and showing our improved auxiliary springs interposed between the main springs and the frame, but we wish it to be clearly understood that this is shown only as one illustration of the way in which our improved auxiliary springs may be used.
Figure 2:
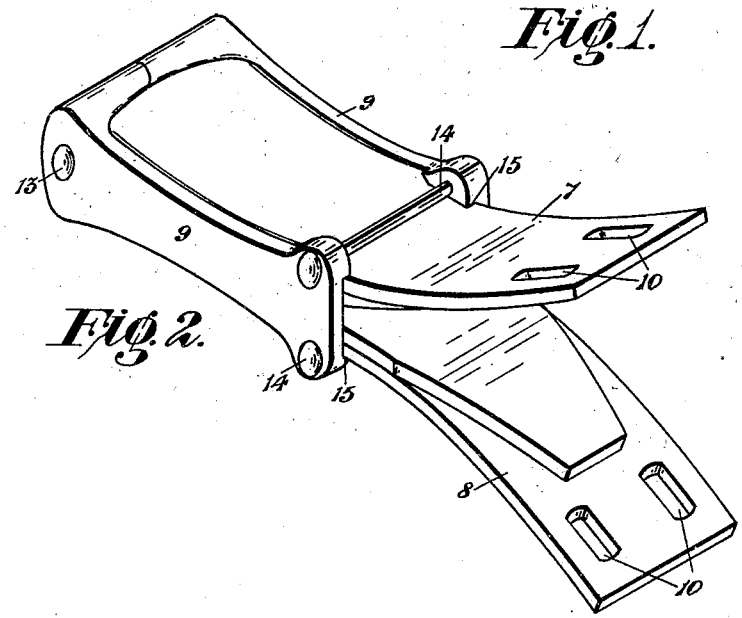
Fig. 2 is a perspective view showing our improved auxiliary spring or shock absorber detached from the main spring.
Figure 3:
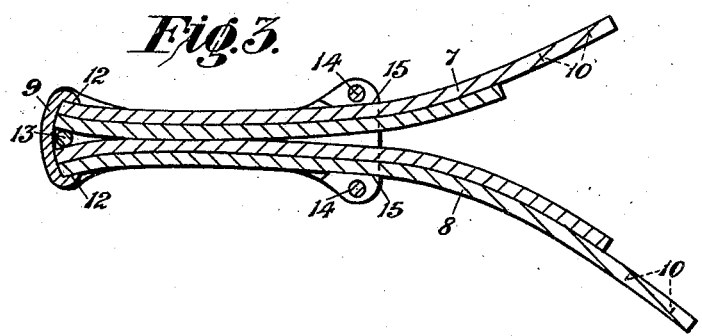
Fig. 3 is a central vertical longitudinal section of same.

The vehicle frame 2 and the main springs 3 may be of any preferred construction. In the type shown in Fig. 1 the frame is a well known construction provided with semielliptic springs. Each main spring 3 is connected at one end to the frame 2 by an ordinary device 4 while at the other end our improved auxiliary spring 5 is interposed between the main spring and the frame.

The auxiliary spring 5 comprises two curved members 7 and 8 that diverge from the junction end, and each member comprises one or more leaves that are secured together at the junction end by the specially devised clamping plates 9, while at the other ends of the curved members are slots 10 to take the bolts of brackets 11 whereby they are adjustably attached to the frame and to the main spring respectively.

At the junction end of the curved spring members the immediate end of each leaf is slightly bent outward so that the opposed innermost leaves contact with one another not at the immediate end but at a short distance therefrom. The convex faces of the spring members 7 and 8 are opposed so that when pressure is applied or a shock imparted to the spring the convex faces will gradually roll together and stiffen the remainder of the divergent parts.

The clamping plates 9, which are used in pairs one upon each side of the spring, fit against the edges of the spring members and are formed at the one end with an inwardly projecting socket with somewhat inwardly inclined or bevelled shoulders 12 adapted to engage the somewhat outwardly bent ends of the spring members 7 and 8 and with a hole to take a bolt 13 which passes between the two innermost leaves of the spring members and holds the two clamping plates together, while at the other end which is approximately midway along the spring they are held together by bolts 14 positioned against the outer faces of the spring members. These latter ends of the clamping plates are preferably formed with shoulders 15 that fit over the outside edges of the spring members and against which the faces of such members normally abut, but the faces of the spring members may abut directly against the bolts 14 which hold the clamping plates together.

The shoulders 15 and the bolts 14 of the clamping plates 9 prevent the divergent spring members opening too wide when the weight is taken off the spring as for instance when the vehicle passes over an exceptional obstruction or hollow or when turning a corner but the closing together of such members is not interfered with thereby.

By this construction we avoid any perforation and consequent weakening of the spring members both at the junction end and at their central portion, and any number of leaves may be easily shaped and tempered separately and fitted together to form a spring of any desired strength and quality.

In use, when the wheels of the vehicle meet a depression or an obstruction the shock will be partly absorbed by the main springs 3 and partly by the auxiliary springs 5, and as the auxiliary springs are brought into operation the convex faces of the members 7 and 8 will gradually come together and so stiffen the remainder of the divergent portions, thereby ensuring that all severe jars and shocks will be absorbed or very greatly minimized. Immediately the depression or obstruction has been passed and the weight taken off the spring there is a tendency for the leaves to open or diverge to too great an extent thereby throwing the body of the vehicle into the air. Such excessive opening however is prevented by the shoulders 15 and bolts 14 of the clamping plates 9 which limit the opening or divergence of the spring members but in no way affect the closing of them together.

We wish it to be understood that various modifications may be made in the form and relative proportions of parts and other details without departing from the principle of our invention as herein disclosed.

We are aware that it is a common practice, where a spring is made up of several leaves, to attach to the end of one or more of the shorter leaves a clip which encircles the longer leaves at that point and prevents them spreading apart on the rebound, but to rivet a clip to a leaf of a spring of the type covered by this application would weaken it too much. By our invention excessive rebound is prevented without the drilling of any holes in the central or other portion of the spring where such holes would be detrimental.

What we claim is—

1. An improved auxiliary spring for vehicles comprising:—two curved members arranged in V form with their convex faces opposed, clamping plates enclosing the adjacent ends of said spring members extending along the edge thereof, and means carried by the extended portions of the plates for engaging said springs at a point remote from said end to limit the opening movement of the spring members.

2. An improved auxiliary spring for vehicles comprising:—two curved members arranged in V form with their convex faces opposed and contacting at a point intermediate the ends thereof, whereby both ends of said springs diverge from said point of contact, clamping plates enclosing one end of the spring members and means extending between and engaging the diverging ends of the spring and functioning with the plates to clamp the spring rigidly at the junction end but permitting limited movement at the other end as and for the purpose specified.

3. An improved auxiliary spring for vehicles comprising:—two curved members arranged in V form with their convex faces opposed, each of said curved members being made up of one or more leaves having at their junction ends a slight outward turn, clamping plates and bolts whereby said spring members are clamped together, each of said clamping plates having at the one end a projecting socket with inwardly inclined shoulders to take the immediate ends of the spring members and a hole to take the bolt which holds them together and having at the other end shoulders to engage the edges of the spring members and holes to take the bolts which hold them together, substantially as and for the purpose specified.

4. In combination with a spring comprising divergent members arranged in approximately V formation clamping plates adapted to retain the junction ends of the spring members and to engage such members medially of their length to limit their divergence and means for securing said plates in position.

5. The combination with a pair of curved spring members arranged with their convex faces opposed and contacting at a point intermediate the ends thereof, of a pair of clamping plates engaging the edges of the springs, and enclosing one end thereof, said plates being provided with shoulders adapted to engage the springs at a point remote from the enclosed end whereby the opening movement of the opposite ends is limited.

6. The combination with a frame, and a spring connected at one end thereof, of a spring device interposed between the opposite end and the frame, said device comprising a plurality of arcuate spring members arranged with their convex faces in opposition and contacting at a point intermediate the ends thereof, and a pair of plates enclosing the adjacent ends of the springs and engaging the springs at a point remote from said end to limit the opening movement of the opposite ends.

7. A spring device comprising a plurality of arcuate spring members arranged with their convex faces in opposed relation and contacting at a point intermediate the ends thereof, and a clamp engaging the sides and ends of said spring members and securing them together without the passage of bolts therethrough.

In testimony that we claim the foregoing as our invention we have signed our names in the presence of two subscribing witnesses this 18th day of November, 1921.

THOMAS HENRY RODDA.
BERTIE NORMAN RODDA.

Witnesses:
ARTHUR GORE COLLISON,
KATHLEEN MARY COLLISON.